US012643249B2

(12) United States Patent
Skrobis et al.

(10) Patent No.: US 12,643,249 B2
(45) Date of Patent: Jun. 2, 2026

(54) METHOD OF COATING A RAZOR BLADE

(71) Applicant: The Gillette Company LLC, Boston, MA (US)

(72) Inventors: Kenneth James Skrobis, Maynard, MA (US); Jason Scott Slattery, Malden, MA (US); Jonathan Raymond Petrie, Braintree, MA (US); Lauren Michelle Salisbury, Braintree, MA (US)

(73) Assignee: The Gillette Company LLC, Boston, MA (US)

( * ) Notice: Subject to any disclaimer, the term of this patent is extended or adjusted under 35 U.S.C. 154(b) by 28 days.

(21) Appl. No.: 18/198,959

(22) Filed: May 18, 2023

(65) Prior Publication Data

US 2023/0373120 A1 Nov. 23, 2023

Related U.S. Application Data

(60) Provisional application No. 63/344,332, filed on May 20, 2022.

(51) Int. Cl.
| | |
|---|---|
| *B26B 21/60* | (2006.01) |
| *B05D 1/00* | (2006.01) |
| *B05D 1/18* | (2006.01) |
| *B05D 3/04* | (2006.01) |
| *B05D 3/06* | (2006.01) |
| *B05D 3/14* | (2006.01) |
| *B05D 5/08* | (2006.01) |
| *C09D 4/00* | (2006.01) |
| *C23C 28/00* | (2006.01) |

(52) U.S. Cl.
CPC .............. *B26B 21/60* (2013.01); *B05D 1/185* (2013.01); *B05D 1/60* (2013.01); *B05D 3/044* (2013.01); *B05D 3/067* (2013.01); *B05D 3/141* (2013.01); *B05D 5/08* (2013.01); *C09D 4/00* (2013.01); *C23C 28/30* (2013.01); *C23C 28/347* (2013.01); *B05D 2350/60* (2013.01)

(58) Field of Classification Search
None
See application file for complete search history.

(56) References Cited

U.S. PATENT DOCUMENTS

| | | | |
|---|---|---|---|
| 3,863,340 A | 2/1975 | Perry | |
| 5,338,579 A | 8/1994 | Ogawa et al. | |
| 5,799,549 A | 9/1998 | Decker et al. | |

(Continued)

FOREIGN PATENT DOCUMENTS

| | | |
|---|---|---|
| DE | 1545023 A1 | 4/1971 |
| EP | 0571896 A2 | 12/1993 |

(Continued)

OTHER PUBLICATIONS

CAS Registry; Registry # 908595-77-7 (Year: 2025).*

(Continued)

*Primary Examiner* — Jose I Hernandez-Kenney
(74) *Attorney, Agent, or Firm* — Andres E. Velarde; John M. Lipchitz

(57) ABSTRACT

A method of making a razor blade by forming a cutting edge on a substrate having an outer bonding surface. A first self-assembled monolayer having a non-fluorinated organic material is deposited on the outer bonding surface of the substrate.

17 Claims, 12 Drawing Sheets

(56) References Cited

U.S. PATENT DOCUMENTS

| | | | | |
|---|---|---|---|---|
| 6,764,758 | B1 * | 7/2004 | Grunze | C08J 7/12 |
| | | | | 427/508 |
| 9,969,094 | B2 | 5/2018 | Hejmowski et al. | |
| 2004/0001943 | A1 * | 1/2004 | Alford | B01J 29/80 |
| | | | | 427/337 |
| 2005/0028389 | A1 | 2/2005 | Wort et al. | |
| 2008/0312356 | A1 * | 12/2008 | Kobrin | C23C 14/12 |
| | | | | 427/255.6 |
| 2010/0098876 | A1 * | 4/2010 | Hanson | B82Y 30/00 |
| | | | | 427/535 |
| 2014/0360021 | A1 | 12/2014 | Sonnenberg et al. | |
| 2015/0328789 | A1 | 11/2015 | Skrobis et al. | |
| 2017/0225195 | A1 * | 8/2017 | Matin | B05D 3/142 |
| 2018/0236678 | A1 * | 8/2018 | Briscoe | C23C 22/68 |
| 2021/0323182 | A1 | 10/2021 | Skrobis et al. | |
| 2023/0288341 | A1 * | 9/2023 | Park | G01N 33/553 |
| 2023/0364818 | A1 | 11/2023 | Park et al. | |
| 2024/0368410 | A1 * | 11/2024 | Bobade | C07C 43/135 |

FOREIGN PATENT DOCUMENTS

| | | |
|---|---|---|
| EP | 3363834 A1 | 8/2018 |
| EP | 3828311 A1 | 6/2021 |
| EP | 4151377 A1 | 3/2023 |
| JP | S63130165 A | 6/1988 |
| JP | H05115633 A | 5/1993 |
| JP | 2015129995 A | 7/2015 |
| WO | 9300204 A1 | 1/1993 |
| WO | 2008123957 A2 | 10/2008 |
| WO | 2010008980 A1 | 1/2010 |

OTHER PUBLICATIONS

CAS Registry; Registry # 1066-35-9 (Year: 2025).*

Murad Bhayo, A., Yang, Y., & He, X. (2022). Polymer brushes: Synthesis, characterization, properties and applications. Progress in Materials Science, 130, 101000. https://doi.org/10.1016/j.pmatsci.2022.101000. (Year: 2022).*

Olivier et al (2012). Surface-initiated controlled polymerization as a convenient method for designing functional polymer brushes: From self-assembled monolayers to patterned surfaces. Progress in Polymer Science, 37(1), 157-181. https://doi.org/10.1016 (Year: 2012).*

PCT Search Report and Written Opinion for PCT/US2023/022804 dated Aug. 30, 2023, 14 pages.

PCT Search Report and Written Opinion for PCT/US2023/022805 dated Aug. 30, 2023, 13 pages.

Wasserman et al., "Structure and 8,9 Reactivity of Alkylsiloxane Monolayers Formed by Reaction of Alkyltrichlorosilanes on Silicon Substrates", vol. 5, No. 4, Oct. 13, 1988, 14 Pages.

Zhang et al., "Boundary Lubrication and Surface Mobility of Mixed Alkylsilane Self-Assembled Monolayers", vol. 107, No. 47, Sep. 5, 2003, pp. 13123-13132.

Non-Final Office Action; U.S. Appl. No. 18/198,966, dated Apr. 22, 2025; See Patent Center.

Non-Final Office Action; U.S. Appl. No. 18/198,974, dated Apr. 122, 2025; See Patent Center.

* cited by examiner

SKIN SURFACE

400

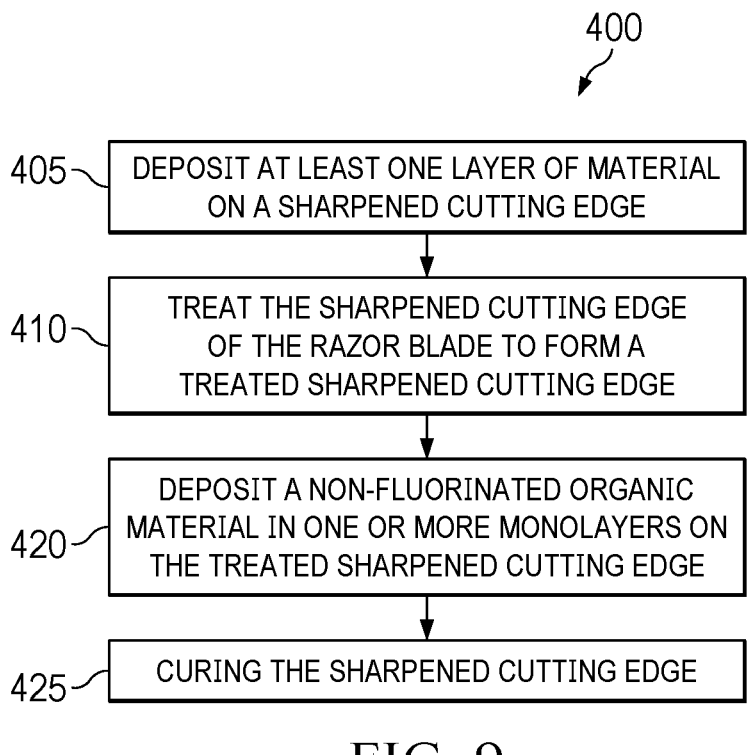

405 — DEPOSIT AT LEAST ONE LAYER OF MATERIAL ON A SHARPENED CUTTING EDGE

410 — TREAT THE SHARPENED CUTTING EDGE OF THE RAZOR BLADE TO FORM A TREATED SHARPENED CUTTING EDGE

420 — DEPOSIT A NON-FLUORINATED ORGANIC MATERIAL IN ONE OR MORE MONOLAYERS ON THE TREATED SHARPENED CUTTING EDGE

425 — CURING THE SHARPENED CUTTING EDGE

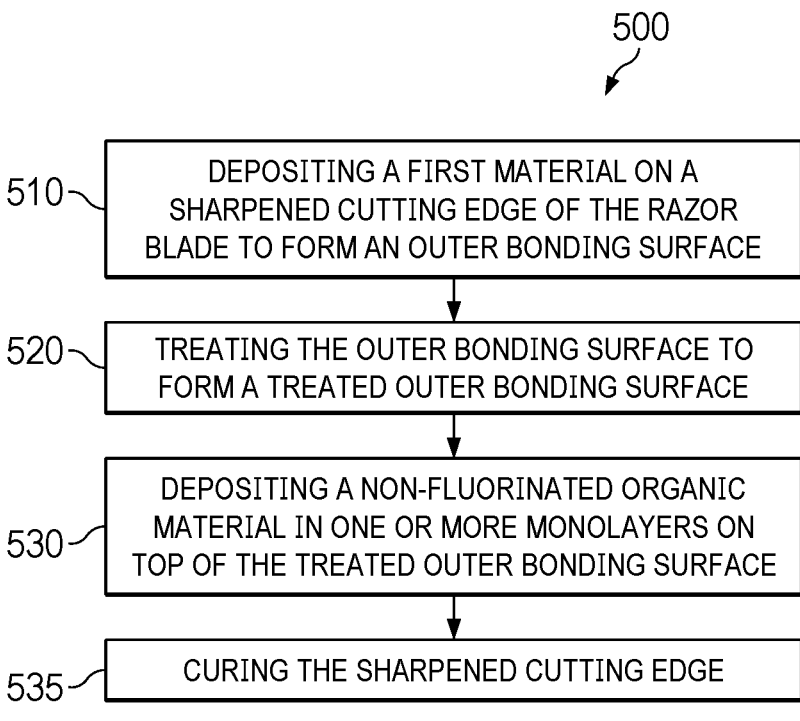

510 — DEPOSITING A FIRST MATERIAL ON A SHARPENED CUTTING EDGE OF THE RAZOR BLADE TO FORM AN OUTER BONDING SURFACE

520 — TREATING THE OUTER BONDING SURFACE TO FORM A TREATED OUTER BONDING SURFACE

530 — DEPOSITING A NON-FLUORINATED ORGANIC MATERIAL IN ONE OR MORE MONOLAYERS ON TOP OF THE TREATED OUTER BONDING SURFACE

535 — CURING THE SHARPENED CUTTING EDGE

FIG. 10

TRICHLOROMETHYLSILANE COATING AND METAL (CHROMIUM) SUBSTRATE

TRICHLOROALKYLSILANE COATING AND METAL (CHROMIUM) SUBSTRATE

FIG. 14

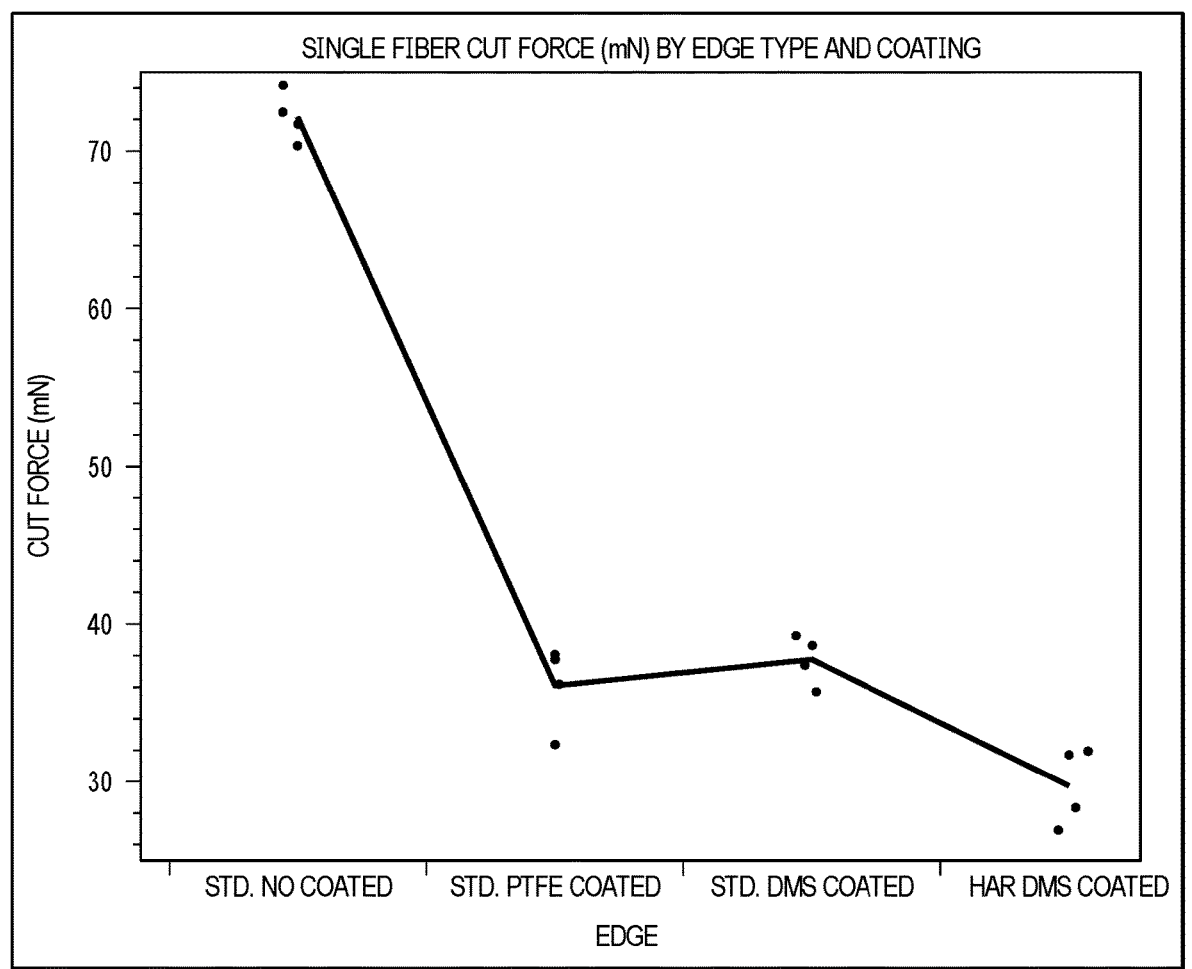

STD. NO COATING: STANDARD RAZOR BLADE EDGE WITH NO ADDITIONAL SURFACE COATING
STD. PTFE COATED: STANDARD RAZOR BLADE EDGE WITH PTFE SURFACE COATING
STD. DMS COATED: STANDARD RAZOR BLADE EDGE WITH ORGANOSILANE SURFACE COATING
       (DIMETHYLSILOXANE) IN ACCORDANCE WITH THE PRESENT DISCLOSURE*
HAR DMS COATED: HIGH ASPECT RATIO HARD COATING (HAR) EDGE WITH ORGANOSILANE
       SURFACE COATING (DIMETHYLSILOXANE) IN ACCORDANCE WITH THE PRESENT DISCLOSURE*
*THE DIMETHYLSILOXANE COATING WAS DEPOSITED FROM DICHLORODIMETHYLSILANE AND
       WATER PRECURSORS

METHOD OF COATING A RAZOR BLADE

FIELD OF THE INVENTION

The present invention relates generally to coating of substrates, and more particularly to improved coatings on razor components, such as razor blades.

BACKGROUND OF THE INVENTION

Typical razor blades used for shaving are commonly created by grinding a sharp bevel onto a martensitic steel substrate. A hard coating is often applied to strengthen the blade edge and to create a tip shape appropriate for shaving, as well as allow for adhesion of an upper coating of polytetrafluoroethylene (PTFE). PTFE is nearly always applied to an upper surface of razor blade edges to create a low energy, non-stick surface required for low cutting forces of hairs. The PTFE coating also allows for good hair engagement and efficient cutting as well as for a high quality of hair cutting. Razor blade edges without a PTFE coating have hair cutting forces that are typically twice as high as PTFE-coated edges. This increase in cutting forces creates significant discomfort for the user during shaving. Discomfort during shaving increases as the number of blades being employed within the shaving razor increases. As the razor blade edges without PTFE coatings are not as efficient at engaging hairs, as compared to PTFE-coated blade edges, additional strokes during shaving may be required. Similar behavior is seen with the quality of hair cutting, with non-PTFE coated edges often skive cutting hair rather than cutting cleanly through the hair.

The application of the PTFE coating typically requires high sintering temperatures (e.g., near 400° C.) to allow for adequate bonding, which often softens, and potentially damages, the steel substrate. This tempering of the steel substrate at such high temperatures reduces the hardness, which can limit the durability of existing edges as well as the ultimate sharpness of potential steel edges. Additionally, to create a uniformly coated blade, the PTFE is often applied in a very thick layer, which is later thinned. This later thinning allows for a comfortable shave with early use of the razor, but also adds additional cost and complexity during blade edge production. Many current processes for application of PTFE to blade surfaces require removal of the blades from the vacuum chamber to spray on aqueous PTFE dispersion, thus increasing the cost and time required for manufacturing. Further, PTFE may be limited to the types of materials to which it will bond. Production and use of fluorinated polymer coatings (e.g., PTFE) are under review by regulators as a class of materials within the broader PFAS chemistries with concerns of environmental persistency.

It is believed that fluorinated polymers are the only lubricious coating that is currently used on blades for multi-blade wet shaving razors. Multi-blade wet shaving razors are the most commonly used wet shaving razors in developed countries, such as the United States and European countries. The technology for fluorinated polymer coated blades has advanced significantly over the last several decades. There are currently no known alternatives to replace fluorinated polymer coated blades, which would not significantly degrade shaving performance. Blade coatings have a significant impact on other factors that go into designing a shaving razor system. For example, over the last several decades, shaving razor cartridge design and blade edge geometry for wet shaving razors have been based on using fluorinated polymer (e.g., PFTE) coated blades. It is believed, without being held to theory, PTFE coated blades do not provide a comfortable shave (e.g., resulting in nicking of the skin) when a high aspect ratio blade geometry is used, for example greater than 2:1. PTFE coatings (fluorinated polymers) may exacerbate nicking and/or discomfort issues for high aspect ratio blades. Accordingly, the shaving razor cartridge design must compensate for the nicking of the skin, for example, by adding additional features to protect the skin (e.g., blade guards and wire wrapping on blades).

Prior to the discovery of fluorinated polymer coatings for blade edges, silicone coatings were used. For example, coating blades with silicone gels. It is believed, without being held to theory, silicone coatings are generally difficult to control coating thickness and require tighter processing conditions (e.g., overcuring vs insufficient curing), which may also be more sensitive to environmental conditions, such as relative humidity and dew point. Accordingly, silicone coated blades tend to have either low durability and low-cut forces or high durability and high cut forces, with a limited processing window to achieve desired low-cut forces with sufficient coating adhesion/durability. High performance blades ideally have high durability and low-cut forces.

As such, there is a need for improved coatings on cutting edges, such as blade edges, that do not utilize PTFE coating, yet still have optimal characteristics (e.g., cutting force, surface energy, minimal nicking of the skin, etc.) for uses such as hair cutting, that minimize softening and potential damage to the substrate, e.g. thermal effects, and that utilize cost-effective and time-effective manufacturing processes.

SUMMARY OF THE INVENTION

Razor blades described herein may comprise a sharpened cutting edge with an outermost layer created by deposition of a lubricious, non-fluorinated organic coating material in one or more monolayers. An outer surface of the sharpened cutting edge may be coated and/or treated, such that bonding of the nonfluorinated organic coating material is facilitated and/or optimized.

In accordance with an aspect of the present disclosure, a razor blade has a sharpened cutting edge with an outer bonding surface. A non-fluorinated organic coating material deposited on the outer bonding surface forming an outermost layer of the sharpened cutting edge. The non-fluorinated organic coating is composed of one or more self-assembled monolayers.

In accordance with an aspect of the present disclosure, a razor blade is provided, the razor blade comprising a sharpened cutting edge and a non-fluorinated organic coating material comprising an organosilane deposited in one or more monolayers on the sharpened cutting edge, in which the deposited organic coating material forms an outermost layer of the razor blade. In some aspects, the sharpened cutting edge may comprise an outer bonding surface, and the non-fluorinated organic coating material may be deposited on the outer bonding surface. In some particular aspects, the outer bonding surface may comprise a boron-rich material. In other aspects, the sharpened cutting edge may comprise a tip portion comprising a cutting edge defined by a sharpened tip and one or more adjacent facets, in which the non-fluorinated organic coating material may be deposited on the tip portion to form a non-fluorinated organic coating. In further aspects, the non-fluorinated organic coating material may be selected from the group consisting of: carboxylates, catechols, amines, alkynes, and alkenes.

In accordance with another aspect of the present disclosure, a method of making a razor blade is provided, in which the method includes treating a sharpened cutting edge of the razor blade to form a treated sharpened cutting edge; and depositing a non-fluorinated organic material comprising an organosilane in one or more monolayers on the treated sharpened cutting edge, such that the organic coating material forms an outermost layer of the razor blade. In some aspects, the method may include depositing a first material on the sharpened cutting edge of the razor blade to form an outer bonding surface, in which treating the sharpened cutting edge comprises treating the outer bonding surface to form a treated outer bonding surface, and depositing the non-fluorinated organic coating material on the treated outer bonding surface.

In accordance with another aspect of the present disclosure, a method of making a razor blade is provided, in which the method includes forming a cutting edge on a substrate having an outer bonding surface. A first self-assembled monolayer having a non-fluorinated organic material is deposited on the outer bonding surface of the substrate.

BRIEF DESCRIPTION OF THE DRAWINGS

While the specification concludes with claims particularly pointing out and distinctly claiming the subject matter which is regarded as forming the present invention, it is believed that the invention will be better understood from the following description which is taken in conjunction with the accompanying drawings in which like designations are used to designate substantially identical elements, and in which:

FIG. 9 is a method for making a razor blade in accordance with the present disclosure.

FIG. 10 is a method for making a razor blade in accordance with the present disclosure.

FIG. 14 is a graph comparing cutting forces of razor blades in accordance with the present disclosure to uncoated razor blades and PTFE-coated razor blades.

DETAILED DESCRIPTION OF THE INVENTION

Figure 1:
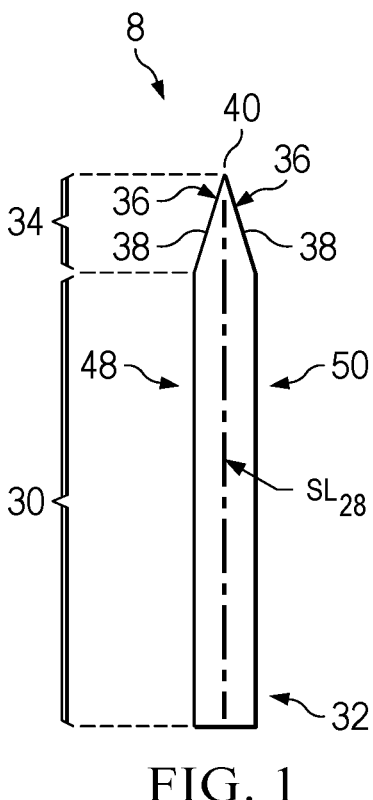
FIG. 1 is a side view of a razor blade with a symmetric substrate, in accordance with the present disclosure.

For purposes of the following detailed description, it is to be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

As used herein, the use of the singular includes the plural and plural encompasses singular, unless specifically stated otherwise. In addition, in this application, the use of "or" means "and/or" unless specifically stated otherwise, even though "and/or" may be explicitly used in certain instances.

The term "asymmetric blade," as used herein, means a blade defined by a substrate having a first portion comprising a blade body and a second portion comprising a tip portion, in which a split line passes through a tip of the tip portion, extends through the first and second portions and separates the second portion into generally asymmetric first and second sections. The outer surface of the first section of the second portion is asymmetric with regards to the outer surface of the second section. The outer surface of the first section of the second portion may function as a skin-contacting surface, and the outer surface of the second section may function as a hair-cutting surface.

A "split line," as used herein, means a line extending through a tip of a tip portion of a substrate, which is generally parallel with first and second generally parallel outer surfaces of a first portion defining a blade body of the substrate and separates or divides the substrate into first and second halves or sections.

The term "gel," as used herein, means a semi-solid structure that consists of dilute cross-linked polymer chains which have an insoluble infusible coherent three-dimensional network within which is contained fluid material of lower molecular weight. A gel may demonstrate little to no flow when in a steady state. The fluid material in the gel can comprise various liquids, including water and water-based solutions (i.e., a hydrogel). The fluid material of a gel is typically fully contained within the polymer chain network of the gel, for example through surface tension and hydrogen bonding.

The term "self-assembled monolayer" and variations thereof (e.g., self-assembling monolayer, SAM), as used herein, means an ordered molecular assembly of organic molecules spontaneously deposited on a surface by means of adsorption. Typically, self-assembled monolayers are formed by reaction of a head group of a molecule in a liquid or vapor phase with a substrate on a surface. Examples of molecules in the liquid or vapor phase that may form a self-assembled monolayer in the present disclosure include non-fluorinated organic compounds, such as organosilanes, carboxylates, catechols, amines, alkynes, and alkenes. A head group of a molecule that reacts with a substrate to form a self-assembled monolayer can be a variety of reactive functional groups, such as silanes, amines, carboxyl groups, alcohols, and hydrolysable groups. Examples of a substrate on the surface upon which a self-assembled monolayer can be deposited in the present disclosure include a metal, an alloy, or a ceramic, such as chromium, platinum, boron, chromium diboride, titanium, titanium diboride, vanadium, aluminum, silicon, tin, tantalum, zirconium, niobium, magnesium, manganese, iron, cobalt, copper, silver, zinc, hafnium, tungsten, molybdenum, or nickel, and oxides, nitrides, and oxynitrides thereof.

Figure 2:
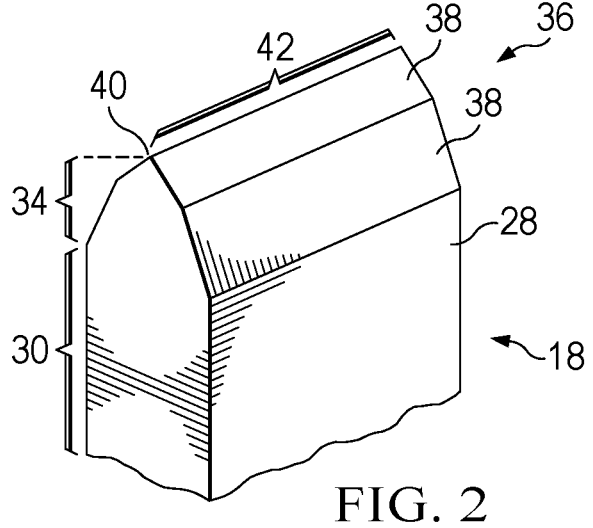
FIG. 2 is a perspective view of a tip portion of another razor blade with a symmetric substrate, in accordance with the present disclosure.
Figure 3:
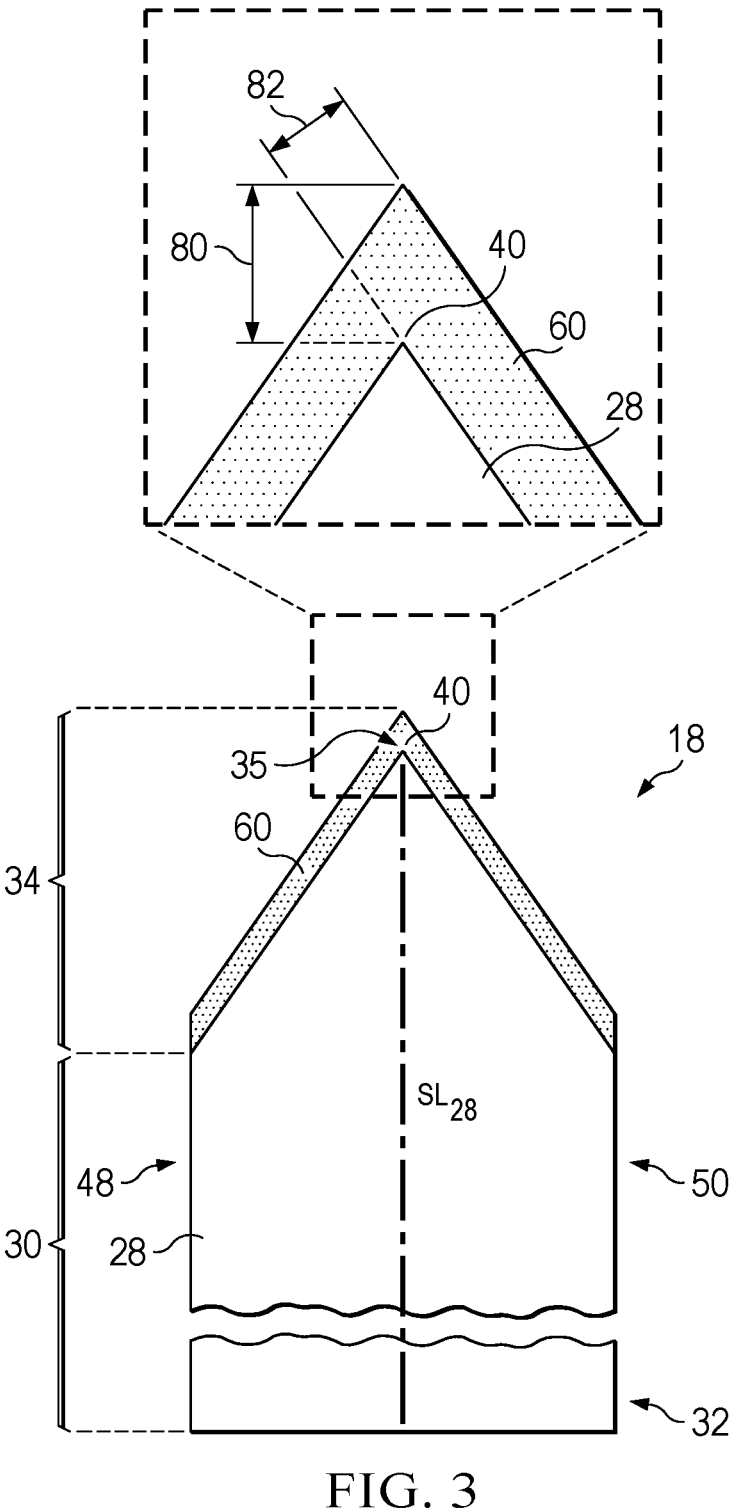
FIG. 3 is a side view of a razor blade with a symmetric substrate and a coating material on a tip portion, accordance with the present disclosure.
Figure 4:
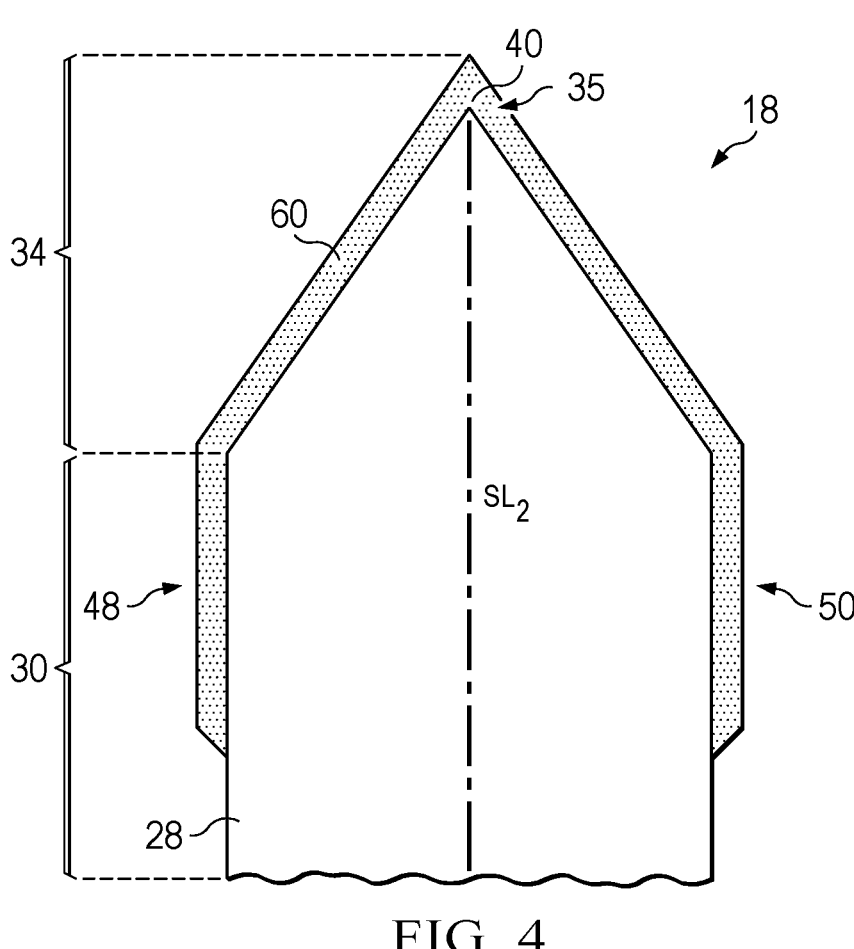
FIG. 4 is a side view of a razor blade with a symmetric substrate and a coating material on the tip portion and a section of a body portion, in accordance with the present disclosure.

Referring now to the Figures, FIGS. 1, 3, and 4 are side views of a cutting member 8 (here, a razor blade) in accordance with aspects of the present disclosure, and FIG. 2 is a detailed perspective view of elements of a cutting member 18 (here, a razor blade) in accordance with aspects of the present disclosure. The razor blades 8 and 18 shown in FIGS. 1-4 may each comprise a substrate 28 and a coating 60 (not visible in FIGS. 1 and 2; see FIGS. 3 and 4) comprising a coating material. As used herein, a "substrate" may signify the substance or material acted upon by the deposition process(es) in the present disclosure. The substrate 28 may comprise one or more metals, alloys, or ceramics. In some examples, the substrate 28 may be stainless steel. The razor blades 8 and 18 may comprise a first portion with a blade body 30 and a second portion with a tip portion 34. The blade body 30 may comprise a base 32, and the tip portion 34 may comprise flanks 36 that converge at a sharpened tip 40 to define a sharpened cutting edge 42, which performs the cutting of hair. The flanks 36 may each comprise one or more bevels or facets 38. The substrate 28 of FIG. 2 is described in more detail in U.S. Pat. No. 9,751,230. The razor blades 8 and 18 may be incorporated into a razor cartridge (not shown).

In the example illustrated in FIGS. 1-4, the substrate 28, specifically the tip portion 34, is substantially symmetric and may comprise a split line $SL_{28}$ that passes through the tip 40 and divides or separates the substrate 28 into substantially equal first and second sections or halves (not labeled). The split line $SL_{28}$ may coincide with a centerline (not shown) of the coating 60, as described herein, such that the split line $SL_{28}$ may also divide or separate the coating 60 into substantially equal first and second sections or halves. The split line $SL_{28}$ may be generally parallel with generally planar, outer surfaces (not labeled) of the blade body 30. One outer side 48 (also referred to herein as a first outer side) of the substrate 28 is disposed opposite the split line $SL_{28}$ with respect to the other outer side 50 (also referred to herein as a second outer side). As used herein, the terms "first" and "second" (i.e., to designate structures such as sections) are for reference only and are not intended to be limiting.

At least a portion of one outer side of the substrate 28, e.g., the first outer side 48, may define a skin-contacting surface, and at least a portion of the other outer side, e.g., the second outer side 50, may define a hair-cutting surface. The two sides of the razor blades 8 and 18 may generally perform different functions (e.g., a bottom side that contacts the skin and a top side that performs cutting of the hair, in which both sides perform cutting of the hair with the top side (e.g., away from the skin) having a larger influence).

As shown in FIGS. 3 and 4, the razor blades 8 and 18 may comprise the coating 60 disposed substantially on at least a portion of the first outer side 48 and the second outer side 50 of the substrate 28. The coating 60 may comprise a single layer, as shown in FIGS. 3 and 4, or may comprise two or more layers (see FIG. 5). As used herein, the term "coating" means a covering, including a monolayer, a free film, an impregnation, or the like, that is applied to an object or substrate, such that the covering may be continuous, discontinuous, may have a single or varying thicknesses, or may exist in a single or multiple planes. The coating 60 may include one or more layers, in which each layer comprises one or more materials. The term "coating" may be used to signify the overall or total coating on one or both sides, e.g., the first and second outer sides 48 and 50, of the razor blade 8, 18.

In the example shown in FIGS. 3 and 4, the coating 60 is depicted as extending along the first outer side 48 and the second outer side 50 of the substrate 28 from the tip region 35 toward the base 32. In some examples, the coating 60 may stop short of the blade body 30 and/or the base 32, and in some particular examples, the coating 60 may be disposed substantially only on the tip portion 34 of the substrate 28, for example as shown in FIG. 3. In other examples, the coating 60 may be disposed on the tip portion 34 of the substrate 28 and at least a portion of the blade body 30, for example as shown in FIG. 4. Coating of the blade body 30 may allow for easier rinsing and debris removal, which may allow for less use of water during cartridge rinsing and cleaning and may result in a cleaner, more aesthetic shaving cartridge over the life of the product. In some particular examples (not shown), the coating 60 may extend from the tip region 35 all the way to the base 32. In some aspects (not shown), the coating 60 may be disposed only on the first outer side 48 or the second outer side 50. In other aspects (not shown), the coating 60 may be disposed on the first and second outer sides 48 and 50 but may extend different distances along the first and second outer sides 48 and 50.

Figure 5:
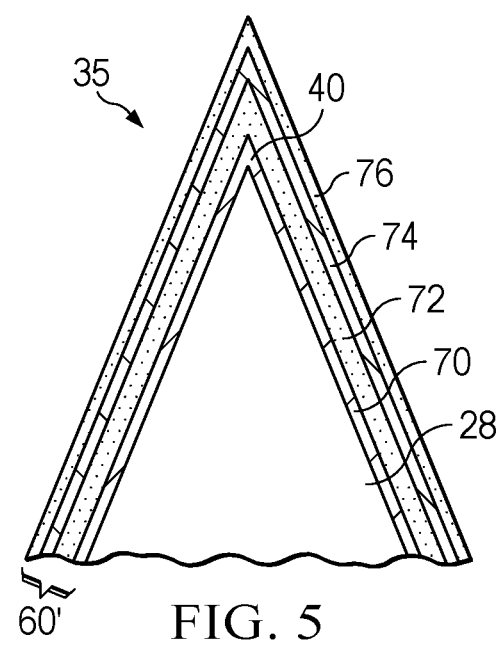
FIG. 5 is a detailed view of a tip portion of a razor blade with a multi-layer coating material, in accordance with the present disclosure.

FIG. 5 provides a detailed view of a tip region 35 of a substrate 28 with a multi-layer coating 60', which may be any substrate in accordance with the present disclosure. The coating 60' may comprise two or more layers, including an outermost layer 76 and one or more of an interlayer 70, a hard coating layer 72, and an overcoat layer 74, and an outer layer 76.

The interlayer 70 may be used to facilitate bonding of the hard coating layer 72 to the substrate 28. Examples of suitable materials for the interlayer 70 may include niobium, titanium, and chromium-containing material(s). A particular interlayer is made of niobium greater than about 100 angstroms and preferably less than about 500 angstroms thick. In some examples, the interlayer 70 may have a thickness from about 150 angstroms to about 350 angstroms.

The hard coating layer 72 may provide improved strength, corrosion resistance, and shaving ability and may be used to obtain a desired tip shape. The hard coating layer 72 may be made from fine-, micro-, or nano-crystalline carbon-containing materials (e.g., diamond, amorphous diamond, or diamond-like-carbon (DLC)), nitrides (e.g., boron nitride, niobium nitride, chromium nitride, zirconium nitride, or titanium nitride), carbides (e.g., silicon carbide), oxides (e.g., alumina, zirconia) or ceramic materials (including nanolayers or nanocomposites). The carbon-containing materials may be doped with other elements, such as tungsten, titanium, silver, or chromium by including these additives, for example, in the target during application by sputtering. The materials may also incorporate hydrogen, e.g., hydrogenated DLC. Preferably, the hard coating layer 72 is made of diamond, amorphous diamond, or DLC. A particular example includes DLC less than about 3,000 angstroms thick, preferably from about 500 angstroms to about 1,500 angstroms thick. DLC layers and methods of deposition are described in U.S. Pat. No. 5,232,568. As described in the "Handbook of Physical Vapor Deposition (PVD) Processing," "DLC is an amorphous carbon material that exhibits many of the desirable properties of diamond but does not have the crystalline structure of diamond."

The overcoat layer 74 may optionally be used to reduce tip rounding of the hard coated edge and to facilitate bonding of the outer layer 76 to the hard coating 72, while still maintaining the benefits of both. The overcoat layer 74 is preferably made of a chromium-containing material, e.g., chromium or chromium alloys or chromium compounds that are compatible with the hard coating 72 and the outer layer 76, e.g., CrPt. A particular overcoat layer 74 is chromium about 100-200 angstroms thick. The overcoat layer 74 may comprise material(s) similar to the interlayer 70 and/or the hard coating layer 72, such as niobium or boron. In some examples, the overcoat layer 74 may have a thickness of from about 50 angstroms to about 500 angstroms, preferably from about 100 angstroms to about 300 angstroms.

The outermost layer 76 may be used to, for example, provide reduced friction. The outermost layer 76 may be a non-fluorinated organic coating material, as described herein. The term "non-fluorinated" as used herein to refer to a material that is free of or devoid of fluorine. The outermost layer 76 is preferably continuous, which may allow for reduced coating thickness and improved first shave results.

Figure 6:
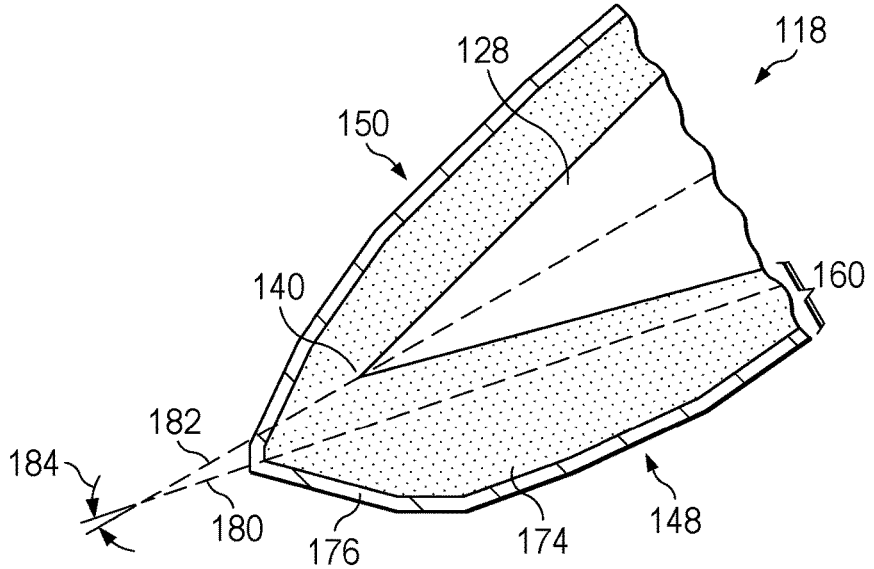
FIG. 6 is a side view of a tip portion of a further razor blade with a symmetric substrate and an asymmetric coating material, in accordance with the present disclosure.

In the examples shown in FIGS. 3-5, the coatings 60 and 60' may generally conform to and/or mirror an outer shape of underlying portions of the substrate 28 and may comprise a substantially uniform thickness. FIG. 6 illustrates an example of a coating 160 that does not conform to and/or mirror an outer shape of underlying portions of a substrate 128 (referred to herein as an asymmetric coating). The asymmetric coating 160 may comprise a variable thickness that varies along at least a portion of the substrate 128. The asymmetric coating 160 may comprise at least an outermost layer 176, which may comprise the non-fluorinated organic coating material as described herein, and, optionally, one or more additional layers 174, which may comprise one or more of layers 70, 72, and 74 in FIG. 5.

The substrate 128 in FIG. 6 may comprise a split line 180 (also referred to as a centerline) that passes through a tip 140 and divides or separates the substrate 128 into substantially equal first and second sections or halves (not labeled). The centerline 180 may be generally parallel with generally planar, outer surfaces of a blade body (not shown; see FIGS. 1-4). The asymmetric coating 160 (including the outermost layer 176) may comprise a centerline 182 that may be offset from the centerline 180 of the substrate 128, as indicated by 184. The asymmetric coating 160 may be deposited on the substrate 128 at an angle with respect to the centerline 180 of the substrate 128, with the centerline 182 of the asymmetric coating 160 being determined by, for example, the angle at which the asymmetric coating 160 is deposited. In some examples, the centerline 182 of the asymmetric coating 160 may be offset from the centerline 180 of the substrate 128 by at least at least 3 degrees, and in other examples, by at least 5 degrees, by at least 8 degrees, or by at least degrees. In all examples, the centerlines 180 and 182 may be offset by up to 30 degrees. The substrate 128 and asymmetric coating 160 in FIG. 6 are illustrated with respect to a skin surface. As described herein, a first outer side 148 of the substrate 128 may define a skin-contacting surface, and at least a portion of the other outer side, e.g., a second outer side 150, may define a hair-cutting surface. The asymmetric coating 160, particularly when the outermost layer 176 comprises the non-fluorinated organic coating material described herein, may help to increase shaving comfort and safety by reducing cutting forces and improving skin management and may also help to increase durability by reducing shear forces and wear on critical surfaces attributed to peak cutting force of hair (i.e., the hair-cutting surface).

Figure 8:
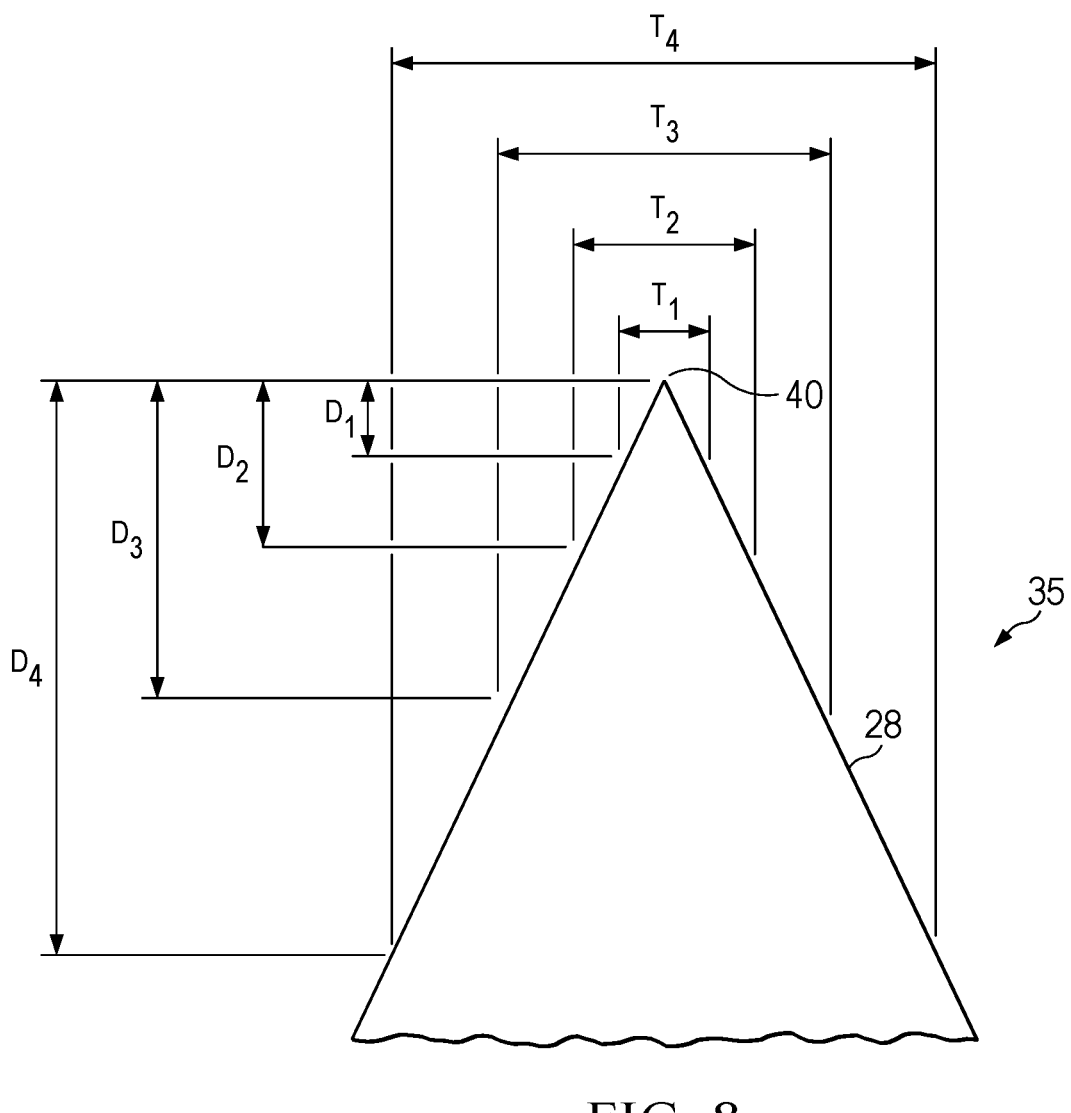
FIG. 8 is a diagrammatic view illustrating a tip region of a razor blade, in accordance with the present disclosure.

With reference to FIG. 8, the substrate 28 may comprise a thickness $T_1$ of between about 1.3 and 2.0 micrometers measured at a distance $D_1$ of four micrometers from the sharpened tip 40, a thickness $T_2$ of between about 2.3 and 3.5 micrometers measured at a distance $D_2$ of eight micrometers from the sharpened tip 40, a thickness $T_3$ of between about 3.8 and 6.4 micrometers measured at a distance $D_3$ of sixteen micrometers from the sharpened tip 40, and/or a thickness $T_4$ of between about 9.3 and 16.2 micrometers measured at a distance $D_4$ of forty micrometers from the sharpened tip 40. Alternatively, or in addition, the substrate 28 may comprise a ratio of thickness $T_1$ measured at four micrometers to the thickness $T_2$ measured at eight micrometers of at least 0.55, and/or a ratio of thickness $T_1$ measured at four micrometers to the thickness $T_3$ measured at sixteen micrometers of at least 0.28.

Figure 7A:
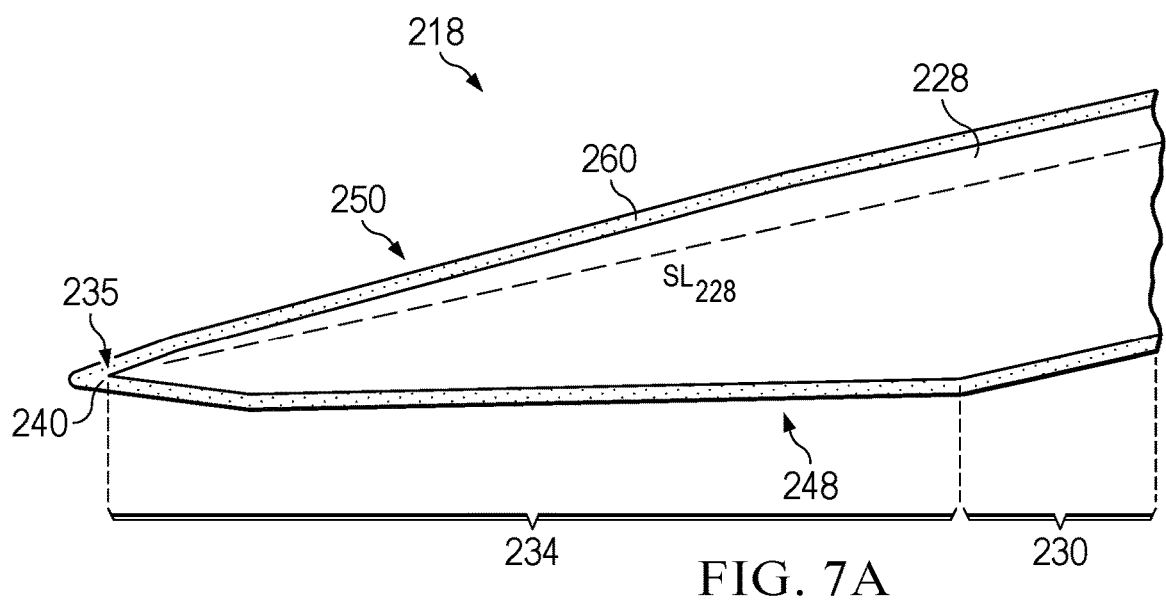
FIG. 7A is a side view of a razor blade with an asymmetric substrate and a coating material, in accordance with the present disclosure.
Figure 7B:
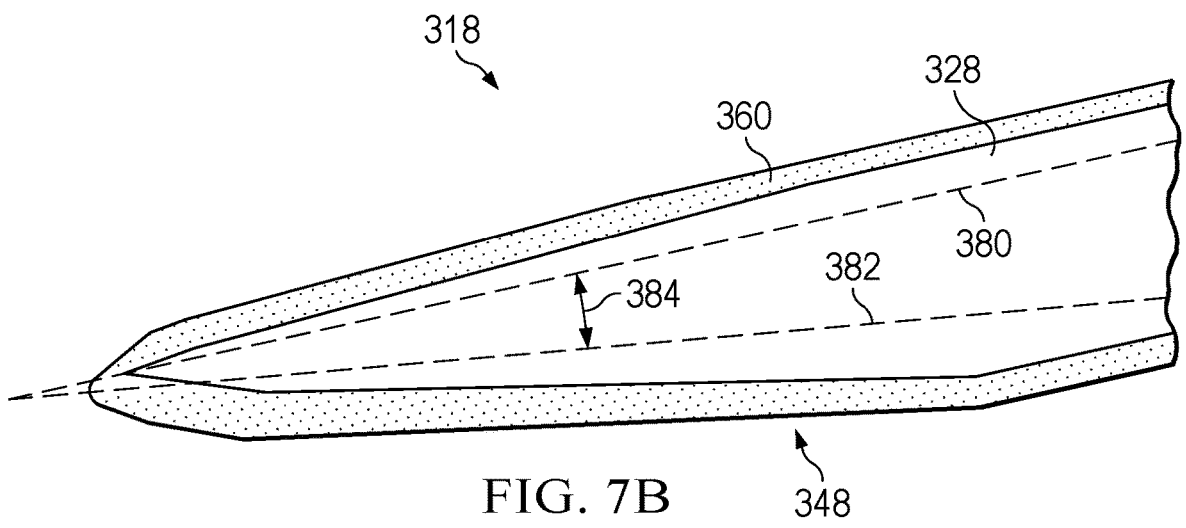
FIG. 7B is a side view another razor blade with an asymmetric substrate and an asymmetric coating, in accordance with the present disclosure.

FIGS. 7A and 7B illustrate examples of a cutting member 218 and 318 (here, a razor blade) that comprises an asymmetric substrate 228 and 328. With reference to FIG. 7A, the razor blade 218 may comprise a first portion with a blade body 230 and a second portion with a tip portion 234, in which the blade body may comprise a base (not shown) and the tip portion 234 may comprise flanks (not labeled) that converge at a sharpened tip 240. The flanks may each comprise one or more bevels or facets (not labeled) that are of unequal length, such that the tip portion 234 is asymmetric. Although the tip portion 234 is depicted as including two facets on each of a first outer side 248 and a second outer side 250, it may be understood that the first and second outer sides 248 and 250 may comprise differing numbers of facets, and in some examples, one of the outer sides, e.g., the second outer side 250, may comprise no facets.

The razor blade 218 may comprise a coating 260 extending along the first and second outer sides 248 and 250 from a tip region 235 toward the base (not shown). As described herein, the first outer side 248 may define a skin-contacting surface, and the second outer side 250 may define a hair-cutting surface. Also as described herein, the coating 260 may be disposed on the tip portion 234 and at least a portion of the blade body 230, as shown in FIG. 7A, or only on the tip portion 234 (not shown; see FIG. 3). Although a single layer is depicted for convenience, the coating 260 may comprise an outermost layer and at least one additional layer, as described herein (see FIGS. 5 and 6).

With continued reference to FIG. 7A, the coating 260 may generally conform to and/or mirror an outer shape of underlying portions of the substrate 228 and may comprise a substantially uniform thickness. A split line $SL_{228}$ may pass through the tip 240 and may be generally parallel with outer surfaces (not labeled) of the blade body 230. Because the coating 260 generally conforms to an outer shape of the substrate 228, the split line $SL_{228}$ of the substrate 228 may coincide with a centerline (not shown) of the coating 260, as described herein.

With reference to FIG. 7B, the substrate 328 may be substantially similar to the substrate 228 in FIG. 7A except that the coating 360 is asymmetric, i.e., the coating 360 does not conform to and/or mirror an outer shape of underlying portions of the substrate 328. The asymmetric coating 360 may comprise a variable thickness that varies along at least a portion of the substrate 328. The substrate 328 may comprise a split line 380 (also referred to as a centerline) that may be substantially similar to the split line $SL_{228}$ shown in FIG. 7A. The asymmetric coating 360 may comprise a centerline 382 that may be offset from the centerline 380 of the substrate 328, as indicated by 384. As described above, the centerline 382 of the asymmetric coating 360 may be determined by an angle at which the asymmetric coating 360 is deposited with respect to the centerline 380 of the substrate 328. In some examples, the centerline 382 of the asymmetric coating 360 may be offset from the centerline 380 of the substrate 328 by at least at least 3 degrees, and in other examples, by at least 8 degrees. In further examples, the centerlines 380 and 382 may be offset by up to 30 degrees. As described above, the asymmetric coating 360, particularly when an outermost layer (not shown) comprises a non-fluorinated organic coating material as described herein, may help to increase shaving comfort and safety, as well as durability.

In accordance with the present disclosure, a cutting member is provided, which may include the razor blades 8, 18, 118, and 218 of FIGS. 1-6, 7A, and 7B. The razor blade may comprise a substrate with a sharpened cutting edge and a non-fluorinated organic coating material deposited on the substrate, specifically on the sharpened cutting edge and/or on the body, in which the non-fluorinated organic coating material forms an outermost layer of the razor blade. The non-fluorinated organic coating material may be adhered directly or indirectly to the substrate. The non-fluorinated organic coating material may be deposited in one or more monolayers (e.g., a self-assembled monolayer). A self-assembled monolayer (SAM) is a one molecule thick layer of material that bonds to a surface in an ordered way as a result of physical or chemical forces during a deposition process. Silanes can form SAMs by solution or vapor phase deposition processes. In certain embodiments a first self-assembled monolayer (SAM) may be adhered directly or indirectly to the substrate and a second self-assembled monolayer (SAM) may be adhered directly to the first self-assembled monolayer (SAM) and/or the substrate (e.g., the outer bonding surface). Additional self-assembled monolayers (SAM) may be added to fill in any gaps on the substrate and/or to build layers on top of the existing self-assembled monolayers (SAM), such as the first self-assembled monolayer (SAM). For example, a third self-assembled monolayer (SAM) may be adhered directly to the first self-assembled monolayer (SAM), the second self-assembled monolayer (SAM) and/or the substrate. In some examples, the razor blade may comprise a tip portion with a cutting edge defined by a sharpened tip and one or more adjacent facets, as described herein, and the non-fluorinated organic coating material may be deposited on the tip portion to form a non-fluorinated organic coating. It is believed without being held to theory, that coating thickness and uniformity are important for lubricious blade coatings, especially silicone-based coatings. Accordingly, for typical coatings, thicker coatings may be needed to ensure full surface coverage to compensate for inconsistencies. Self-assembled monolayers may provide the benefit of coating the full surface (of the desired area) of a blade without excessive application beyond the desired thickness and target surfaces (e.g., beyond the tip portion). For example, self-assembled monolayers may be applied to the blade in very thin layers at a time providing greater control and consistency of the thickness, and the uniformity of coverage.

The substrate, including the sharpened cutting edge, may comprise a metal, an alloy, or a ceramic, e.g., stainless steel. In some examples, the substrate, specifically the sharpened cutting edge, may comprise one or more of the following materials, e.g., as at least one additional layer of material disposed between the sharpened cutting edge and the nonfluorinated organic coating material (see FIGS. 5 and 6): (i) diamond, amorphous diamond, or diamond-like-carbon (DLC); or (ii) chromium, platinum, boron, chromium diboride, titanium, titanium diboride, vanadium, aluminum, silicon, tin, tantalum, zirconium, niobium, magnesium, manganese, iron, cobalt, copper, silver, zinc, hafnium, tungsten, molybdenum, or nickel, and oxides, nitrides, and oxynitrides thereof. In one example, the one or more additional layers of material may comprise chromium. In one particular example, the additional layers may comprise a layer of niobium, a layer of DLC, a layer of chromium, and an outermost layer comprising a non-fluorinated organic coating material, as described herein. In another example, the one or more additional layers of material may comprise boron, including a metal boride such as chromium diboride, a metal boride alloy, or a boron-rich mixture or alloy. As used herein, the term "boron-rich" may refer to a material containing at least 50 atomic % boron. In one particular example, the additional layers may comprise a layer of niobium, a layer of DLC, a layer of boron or a boron-rich material, and an outermost layer comprising a non-fluorinated organic coating material, as described herein Non-Fluorinated Organic Coating Comprising Organosilane(s)

In some examples, non-fluorinated organic coating material may comprise an organosilane. Examples of organosilanes may include compounds or a mixture of compounds having the following general formula:

$$SiR_nX_m$$

in which R is an alkyl group; X is a leaving group, such as a chloride, alkoxy, or hydride; n=1-3; and m=1-3; n+m=4. The alkyl group(s) R may be identical to one another or may be different alkyl groups. The alkyl group(s) R may be substituted or unsubstituted, linear or branched, saturated or unsaturated, etc.

In some examples, the organosilane may be derived from a compound having a hydrolysable group. In other examples, the organosilane may be derived from a compound selected from the group consisting of: a chlorosilane, an alkoxysilane, a hydroxysilane, and a hydrosilane.

In particular examples, the organosilane may be derived from an alkoxysilane, in which the alkoxysilane may be selected from the group consisting of: a trimethoxysilane, dimethoxysilane, and an ethoxysilane. The alkoxysilane may comprise one or more alkyl side chains, in which the one or more alkyl side chains have saturated carbon-carbon bonds. In certain aspects, the one or more alkyl side chains having saturated carbon-carbon bonds may consist of the general formula:

$$CH_3(CH_2)_n$$

in which n=0-18. In some examples, n=0-17 or n=0-10. In other examples, n=0-8.

In further examples, the non-fluorinated organic coating material may comprise an organosilane derived from bis (trimethylsilyl)amine or derived from hexamethyldisiloxane.

The non-fluorinated organic coating material may comprise an organosilane derived from a chlorosilane. Examples of chlorosilanes may include compounds or a mixture of compounds having the following general formula:

$$SiR_nCl_m$$

in which R is an alkyl group, n=1-3, and m=1-3, and n+m=4. The alkyl group(s) R may be identical to one another or may be different alkyl groups.

The alkyl group(s) R may be saturated or unsaturated, substituted or unsubstituted, linear or branched, etc. The organosilane may be derived from a chlorosilane consisting of one chlorine atom, two chlorine atoms, or three chlorine atoms. In some examples, the organosilane may be derived from a chlorosilane selected from the group consisting of: methyltrichlorosilane, dimethyldichlorosilane, t-butyltrichlorosilane, 3,3-dimethylbutyltrichlorosilane, dodecyltrichlorosilane, and mixtures thereof. In certain aspects, the one or more alkyl side chains having saturated carbon-carbon bonds may consist of the general formula:

$$CH_3(CH_2)_n$$

in which n=0-18. In some examples, n=0-10. In other examples, n=0-8.

The use of bis-siloxanes such as 1,2-bis(trimethoxysilyl) decane or 1,2-bis(trichlorosilyl)decane and other trialkoxysilane and/or trichlorosilane may have the advantage of allowing for much greater bonding to the substrate and to each other.

Non-Fluorinated Organic Coating Comprising Other Materials

In other examples, the non-fluorinated organic coating material may be selected from the group consisting of: carboxylates, catechols, amines, alkynes, and alkenes. In some aspects, the non-fluorinated organic coating material is not an organophosphorus compound. In other aspects, the non-fluorinated organic coating material is not an organophosphorus acid or a derivative thereof.

Properties of the Non-Fluorinated Organic Coating Material and Substrates Coated Therewith Surface energy may correspond to the cutting force of a cutting member, such as a razor blade. In general, it is desirable to provide a coating material with a relatively low surface energy, while still maintaining a required level of durability to withstand shaving applications. The non-fluorinated organic coating material in accordance with the present disclosure may have a surface energy of less than 40 dynes/cm. In aspects, the non-fluorinated organic coating material has a surface energy of less than 37 dynes/cm, less than 35 dynes/cm, less than 33 dynes/cm, or less than 31 dynes/cm. Surface energy is a measure of the excess energy present at the surface of a material, in comparison to at its bulk, and is typically given in units of dynes per centimeter (i.e., dynes/cm). Surface energies may be determined by a dyne test, in which liquids (e.g., water, diiodomethane, inks, etc.) are applied to a surface and the amount the liquid either spreads out or beads up on the surface is measured for example by measuring the contact angle between the liquid droplet and the surface of the material. For materials with a high surface energy, applied liquid droplets typically spread and form a film on surface of the material. Conversely, for materials with a low surface energy, applied liquid droplets typically form beads.

The non-fluorinated organic coating material may be deposited in one or more monolayers on the substrate, including the sharpened cutting edge and/or the body. In some examples, each of the one or more monolayers may be a self-assembled monolayer. In other examples, the non-fluorinated organic coating is not a gel. The non-fluorinated organic coating material may form a layer that is less than 500 Angstroms thick. In aspects, the non-fluorinated organic coating material forms a layer that is less than 100 Angstroms thick, or less than 30 Angstroms thick. The thickness of the layer of non-fluorinated organic material may be as little as 7-10 Angstroms. These relatively thin coatings are expected to be uniform in thickness and continuous in coverage, which could influence coating quality and consistency, and allow for reduced cutting forces and a more comfortable shave, as well as a small tip radius due to the coating being more conformal to the blade edge substrate surface. Thicker outermost coatings, e.g., coatings originating from polymer precursors, including crosslinked or gel coatings, may result in a greater edge cross-section and tip radius, which may increase cutting forces and/or reduce hair engagement and cutting efficiency. Increased coating thickness also increases surface shear forces and encourages unacceptable wear of the outermost coating.

The coating, including the non-fluorinated organic coating, may have an aspect ratio (a) to (b), as shown in the inset in FIG. 3, in which (a) is a first thickness 80 from a tip 41 defined by the non-fluorinated organic coating 60 (defines the outermost layer) to the sharpened tip 40 of the substrate 28, and (b) is a second thickness 82 from an outer surface (not labeled) of the non-fluorinated organic coating 60 to an underlying surface (not labeled) of the substrate 28. The thickness 82 may be measured at a distance of four micrometers from the sharpened tip 40 (e.g., see distance $D_1$ in FIG. 8). In some examples, the aspect ratio (a) to (b) may be at least about 1.5:1, at least 2:1, or at least 2.5:1, ±0.5 for (a). In some particular examples, the aspect ratio (a) to (b) may be up to 3.5:1, and in other particular examples, the aspect ratio (a) to (b) may be up to 4:1. In general, a higher aspect ratio translates to a sharper cutting edge and a lower cutting force.

Figure 11A:
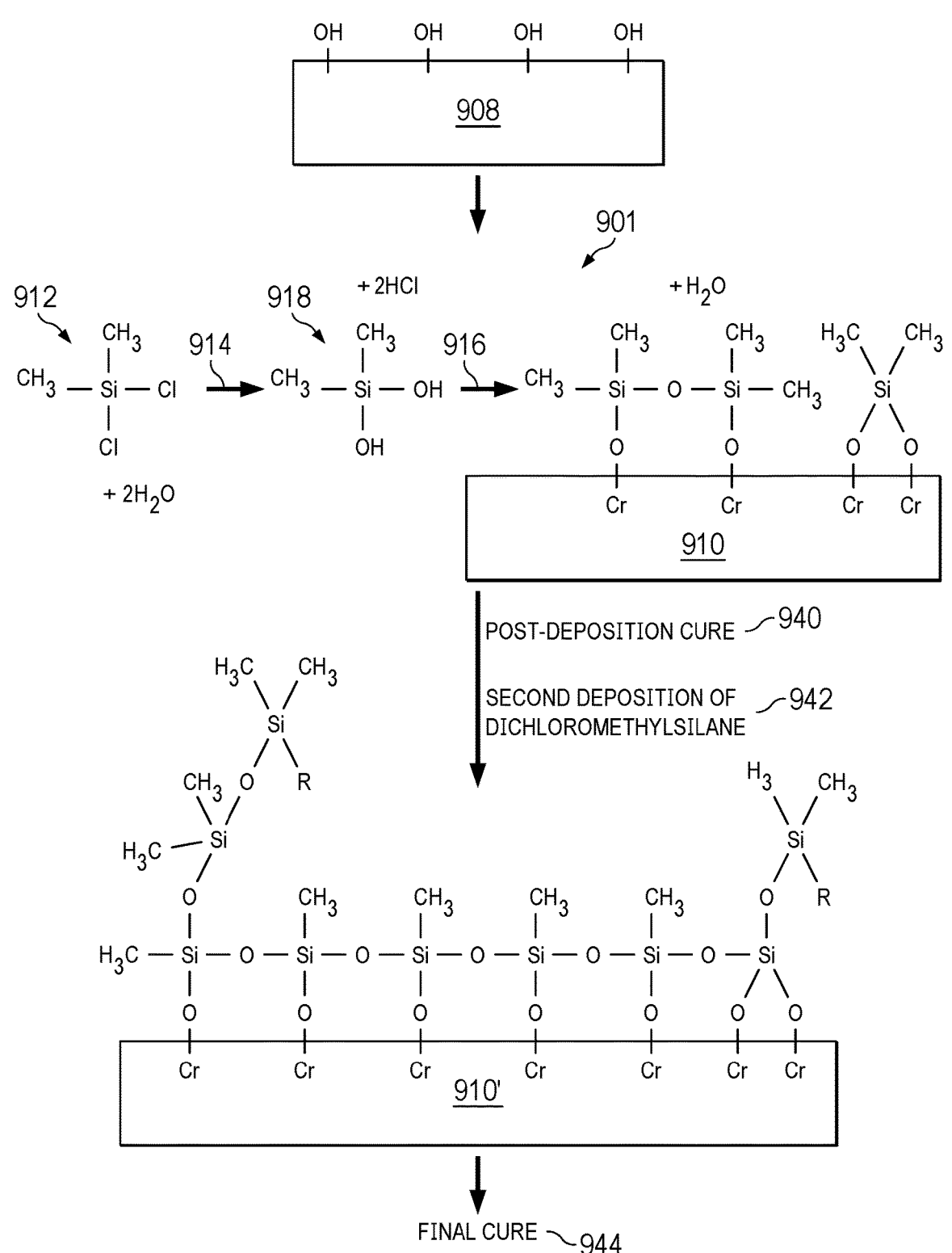
FIGS. 11A-11C are chemical reactions of chloroalkylsilane coatings with a chromium substrate in accordance with the present disclosure.
Figures 13A, 13B:
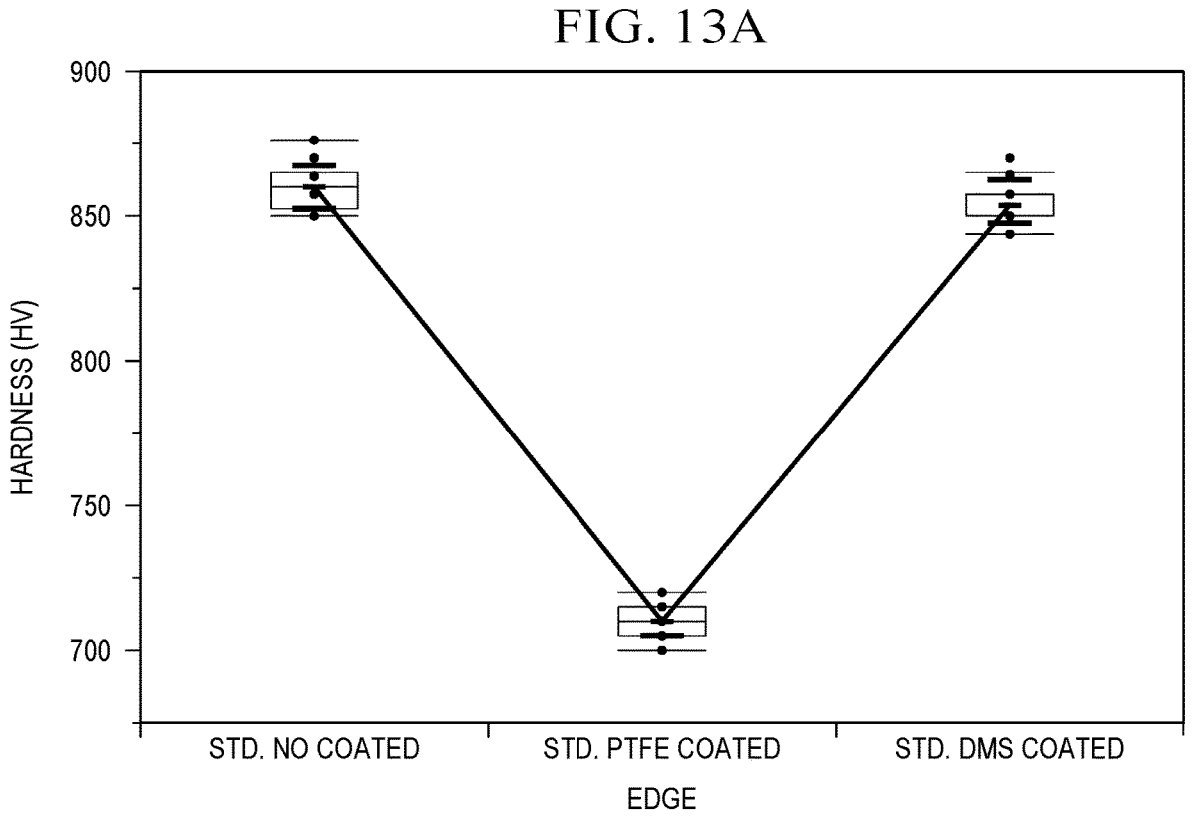
FIGS. 13A and 13B are graphs comparing body hardness of razor blades in accordance with the present disclosure to uncoated razor blades and PTFE-coated razor blades.

As described herein, coatings comprising a non-fluorinated organic material require lower processing temperatures (less than 300° C. and preferably less than 150° C.), as compared to the processing temperatures required for PTFE (typically about 400° C.). FIGS. 13A and 13B are graphs comparing body hardness of razor blades in accordance with the present disclosure (Std. DMS Coated) to uncoated razor blades (Std. No Coating) and razor blades with a PTFE coating (Std. PTFE Coated). FIG. 13A provides an average Vickers hardness of the razor blades, and FIG. 13B provides a percent hardness, as measured against the uncoated razor blades. The uncoated "control" razor blades (Std. No Coating) include a stainless steel razor blade with a layer of niobium, DLC, and chromium, with no additional lubricious coating. The Std. PTFE Coated razor blades include razor blades from the same lot with an additional PTFE coating over the chromium, in which the razor blade undergoes sintering at a temperature above the melting point of PTFE. The Std. DMS Coated razor blades include razor blades from the same lot with an additional organosilane coating, i.e., dimethylsiloxane (DMS), over the chromium, in accordance with the present disclosure (e.g., as shown in FIG. 11A).

It can be seen in FIGS. 13A and 13B that the Std. PTFE Coated razor blades exhibit significantly reduced body hardness, as compared to the Std. No Coating razor blades, with the hardness of the Std. PTFE Coated razor blades being about 18% lower than the hardness of the Std. No Coating razor blades. It is believed that the reduction in hardness for the Std. PTFE Coated razor blades is due, at least in part, to the higher processing temperature, i.e., a sintering temperature of >300° C., which can significantly reduce razor blade's hardness through thermal tempering. In contrast, the Std. DMS Coated razor blades exhibit a body hardness similar to the Std. No Coating razor blades, with almost no reduction in hardness. It is believed that this retention of hardness in the Std. DMS Coated razor blades is due, at least in part, to the lower processing temperatures permitted by the non-fluorinated organic coating material described herein, which reduces the softening of and thus reduces potential for damage to the stainless steel substrate as well as potential for reducing damage to the blade edge during shaving.

Flow Diagrams

FIGS. 9 and 10 are flow diagrams illustrating exemplary methods 400 and 500, respectively, of making a razor blade in accordance with the present disclosure. As shown in FIG. 9, the method 400 may comprise treating a sharpened cutting edge (coated or uncoated) of the razor blade to form a treated sharpened cutting edge at 410 and depositing a non-fluorinated organic material in one or more monolayers on the treated sharpened cutting edge at 420, such that the organic coating material forms an outermost layer of the sharpened cutting edge. In some examples, the non-fluorinated organic material comprises an organosilane. In other examples, the non-fluorinated organic material is selected from the group consisting of: carboxylates, catechols, amines, alkynes, and alkenes. In both examples, the monolayer(s) may be a self-assembled monolayer.

The non-fluorinated organic material may be deposited using any suitable technique or combination of techniques, including vapor deposition such as PVD and Atomic Layer Deposition, dipping, flooding, spraying, or soaking. Brushing may also be used for soft coating(s). In some examples, depositing the non-fluorinated organic material may comprise vapor deposition in a vacuum. Examples of razor blades and processes of manufacture are described in U.S. Pat. Nos. 5,295,305; 5,232,568; 4,933,058; 5,032,243; 5,497,550; 5,940,975; and 5,669,144; EP 0591339; and PCT 92/03330, which are hereby incorporated by reference.

In aspects, a temperature, e.g., a processing temperature during the method 400, does not exceed 300° C. In particular aspects, the temperature does not exceed 200° C., does not exceed 160° C., does not exceed 150° C., does not exceed 100° C., or does not exceed 50° C., or does not exceed 45° C.

The method 400 may further comprise curing the sharpened cutting edge after depositing the non-fluorinated organic material at 425, e.g., to improve bonding and adhesion of the non-fluorinated organic material to the sharpened cutting edge. Curing may comprise one or more of curing by ultraviolet (UV) light, thermal curing, or non-oxidizing plasma treatment. When the curing comprises UV curing, the curing may be carried out with UV light having a wavelength of between 100 nm and 400 nm. The outer sides or surfaces of the razor blade, i.e., the skin-contacting surface and the hair-cutting surface, may be cured independently using different wavelengths of light and/or curing times. For example, the skin-contacting surface may be made both durable and less hydrophobic, increasing the edge glide over the skin in wet shaving environments. This UV modification of the skin-contacting surface may be complementary with an asymmetric coating, as discussed herein.

Treatment of the sharpened cutting edge, e.g., by etching, may be performed to clean and activate the surface in preparation for deposition of the coating material, for example, by oxidizing the surface to generate hydroxyl groups (—OH) on a surface of the sharpened cutting edge. These hydroxyl groups act as bonding sites for the non-fluorinated organic material, which improves adhesion, e.g., covalent bonding, between the surface and the coating material. In principle, activation can be obtained in a variety of ways. Optimum activation methods vary per oxide. In some examples, treating the sharpened cutting edge may comprise plasma etching, e.g., plasma etching with a gas mixture comprising a process gas and a carrier gas. In some aspects, the process gas may be selected from the group consisting of molecular oxygen and water, and/or the carrier gas may comprise one or more noble or inert gases and may be selected from the group consisting of: nitrogen, argon, helium, neon, krypton, xenon and radon. In other aspects, the treatment may comprise plasma etching with molecular oxygen alone or with argon alone. In further aspects, the treatment may comprise plasma etching with molecular oxygen and argon. In yet further aspects, treating the sharpened cutting edge comprises plasma etching with a process gas of hydrogen and one or more carrier gases comprising nitrogen, argon, helium, neon, krypton, xenon, or radon.

A surface onto which the non-fluorinated organic material is deposited may be referred to herein as "an outer bonding surface." In some examples, the outer bonding surface may comprise the treated (uncoated) sharpened cutting edge. In other examples, the method 400 may further comprise depositing at least one layer of material on the sharpened cutting edge at 405 prior to treatment to form a coated sharpened cutting edge, which may serve as the outer bonding surface. The at least one layer of material is disposed between the sharpened cutting edge and the non-fluorinated organic coating material and treating the sharpened cutting edge comprises treating the coated sharpened cutting edge. The at least one layer of material may include one or more of an outer layer, an interlayer, a hard coating layer, and an overcoat layer (see FIG. 5) and may comprise one or more of: (i) diamond, amorphous diamond, or diamond-like-carbon (DLC); or (ii) chromium, platinum, boron, chromium diboride, titanium, titanium diboride, vanadium, aluminum, silicon, tin, tantalum, zirconium, niobium, magnesium, manganese, iron, cobalt, copper, silver, zinc, hafnium, tungsten, molybdenum, or nickel, and oxides, nitrides, and oxynitrides thereof. Steps 420 and 425 may optionally be repeated as described herein to obtain one or more additional monolayers of the non-fluorinated organic material.

With reference to FIG. 10, the method 500 may comprise depositing a first material on a sharpened cutting edge of the razor blade to form an outer bonding surface at 510; treating the outer bonding surface to form a treated outer bonding surface at 520; and depositing a non-fluorinated organic material in one or more monolayers on top of the treated outer bonding surface at 530, such that the organic coating material forms an outermost layer of the sharpened cutting edge. In some examples, the non-fluorinated organic material comprises an organosilane. In other examples, the non-fluorinated organic material is selected from the group consisting of: carboxylates, catechols, amines, alkynes, and alkenes.

Depositing the first material to form the outer bonding surface may comprise depositing one or more of an outer layer, an interlayer, a hard coating layer, and an overcoat layer (see FIG. 5), in which the outer bonding surface may comprise the material or layer immediately subjacent to the non-fluorinated organic material, i.e., the material or layer to which the non-fluorinated organic material bonds. With reference to the example shown in FIG. 5, the overcoat layer 74 may serve as the outer bonding surface for the outermost layer 76. In other examples (not shown), the overcoat layer 74 may be omitted, and the hard coating layer 72 may serve as the outer bonding surface. The outer bonding surface may comprise one or more of: (i) diamond, amorphous diamond, or diamond-like-carbon (DLC); or (ii) chromium, platinum, boron, chromium diboride, titanium, titanium diboride, vanadium, aluminum, silicon, tin, tantalum, zirconium, niobium, magnesium, manganese, iron, cobalt, copper, silver, zinc, hafnium, tungsten, molybdenum, or nickel, and oxides, nitrides, and oxynitrides thereof. In some particular examples, the outer bonding surface may comprise a metal boride, a metal boride alloy, or a boron-rich metal mixture or alloy. The material forming the outer bonding layer may be deposited using any suitable method, as described herein.

Deposition of the non-fluorinated organic material and treatment of the outer bonding surface in FIG. 10 may be performed using one or more of the techniques described above with respect to FIG. 9. The method may further comprise curing the sharpened cutting edge after depositing the non-fluorinated organic material at 535, which may be performed as described above with respect to FIG. 9. The method 500 depicted in FIG. 10 may be performed at a temperature, i.e., a processing temperature, as described above with respect to FIG. 9. Steps 530 and 535 may optionally be repeated as described herein to obtain one or more additional monolayers of the non-fluorinated organic material. The step of curing between depositing additional monolayers may be optional (e.g., multiple layers deposited without curing in between).

Figure 11B:
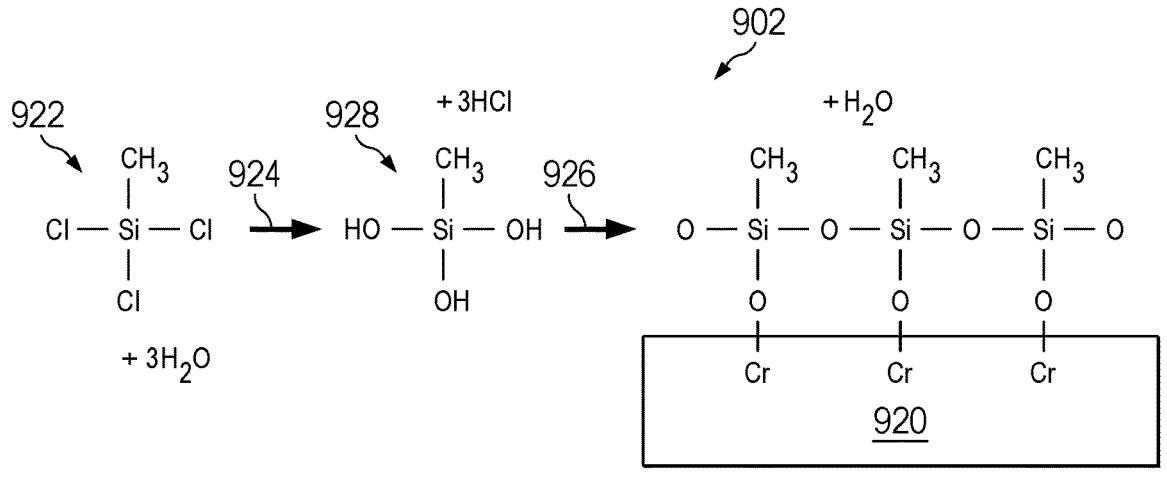
Figure 11C:
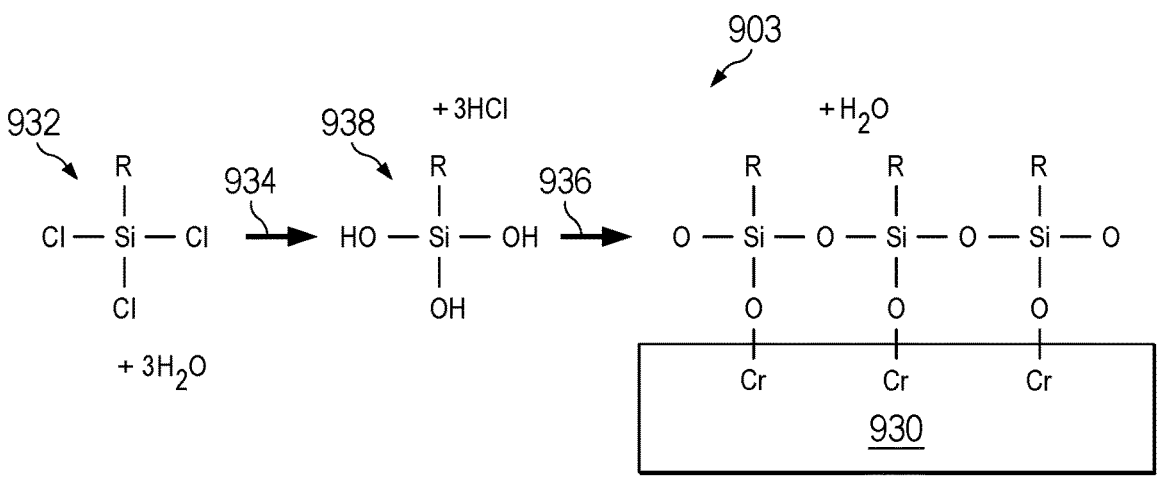
Figure 12:
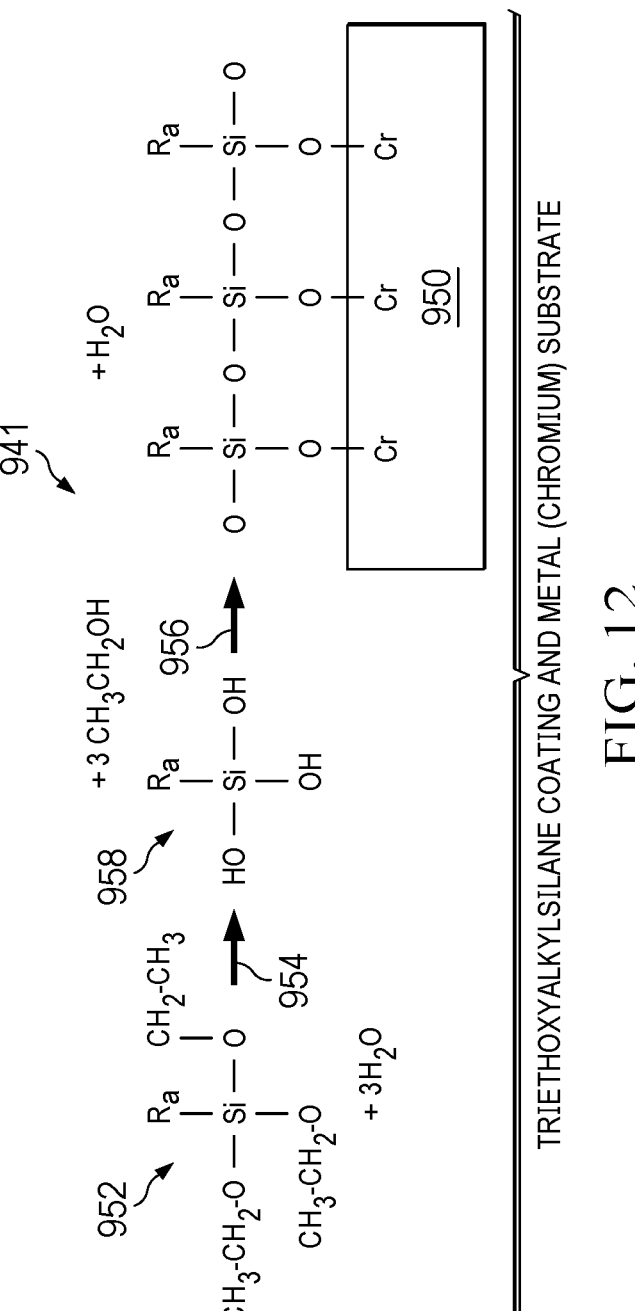
FIG. 12 is a chemical reaction of an ethoxyalkylsilane coating with a chromium substrate in accordance with the present disclosure.

FIGS. 11A-11C and 12 depict exemplary chemical reactions 901, 902, 903, 941 that may be utilized in the methods or in manufacturing a cutting member, such as a razor blade, in accordance with the present disclosure. FIGS. 11A-11C depict deposition of various chlorosilane coating materials 912, 922, 932 on a substrate 910, 920, 930, e.g., via vapor deposition, while FIG. 12 depicts deposition of an ethoxysilane 952 on a substrate 950, e.g., via dipping, flooding, or soaking. The substrate 910, 920, 930, 950 may comprise, for example, a sharpened cutting edge and/or a body of the razor blade. Although a chromium (Cr) substrate is depicted, the substrate 910, 920, 930, 950 may comprise any other material or combination of material described herein. Prior to deposition of the coating material 912, 922, 932, or 952 in FIGS. 11A-11C and 12, the substrates 910, 920, 930, 950 may be treated, e.g., via etching as described herein, to clean and oxidize the surface and produce a substrate 908 with multiple hydroxyl (—OH) groups, as depicted in FIG. 11A.

FIG. 11A depicts a chemical reaction 901 in which dichlorodimethylsilane 912 is deposited on the substrate 908. The first step 914 of the reaction 901 is hydrolysis, in which dichlorodimethylsilane 912 is combined with water molecules, causing the two chlorine groups from each dichlorodimethylsilane molecule 912 to be replaced with two hydroxyl (—OH) side groups and two hydrochloric acid molecules per dichlorodimethylsilane 912 to be released. The second step 916 of the reaction 901 is covalent bonding of a dichlorodimethylsilane derivative 918 from step 914 with the substrate 910 and with one another. In step 916, dehydration of the dichlorodimethylsilane derivative 918 allows for bonding of the dichlorodimethylsilane derivative 918 with the substrate 910 via the oxygen groups of the dichlorodimethylsilane derivative 918 to form a monolayer as shown. The dichlorodimethylsilane derivatives 918 may also bond with one another via their oxygen groups. A single dichlorodimethylsilane group may bond twice to the substrate 910 via two chromiums or may bond once to the substrate 910 via one chromium and once to another dichlorodimethylsilane. The (coated) substrate 910 may undergo a post-deposition cure at step 940, which may be UV and/or thermal, as described herein, after which the reaction 901 may conclude. The reaction 901 may optionally comprise a second deposition step 942, in which a second monolayer of dichlorodimethylsilane 912 is deposited to form a substrate 910'. The substrate 910' may undergo a final cure at step 944, after which the reaction 901 may conclude.

FIG. 11B depicts a chemical reaction 902 in which trichloromethylsilane 922 is deposited on the substrate 908 (see FIG. 11A). The first step 924 of the reaction 902 is hydrolysis, in which trichloromethylsilane 922 is combined with water molecules, causing the three chlorine groups from each trichloromethylsilane molecule 922 to be replaced with three hydroxyl (—OH) side groups and three hydrochloric acid molecules per trichloromethylsilane 922 to be released. The second step 926 of the reaction 902 is covalent bonding of a trichloromethylsilane derivative 928 from step 924 with the substrate 920 and with one another. In step 926, dehydration of the trichloromethylsilane derivative 928 allows for bonding of the trichloromethylsilane derivative 928 with the substrate 920 via the oxygen groups of the trichloromethylsilane derivative 928 to form a monolayer as shown. The trichloromethylsilane derivatives 928 may also bond with one another via their oxygen groups. Although not shown, the (coated) substrate 920 may undergo a post-deposition cure following step 926 and may optionally undergo a second deposition step and a second cure (see FIG. 11A).

FIG. 11C depicts a chemical reaction 903 in which trichloroalkylsilane 932 is deposited on the substrate 908 (see FIG. 11A). The R group of the trichloroalkylsilane 932 may be any alkyl group as described herein (for example, the alkyl may be substituted or unsubstituted, linear or branched, saturated or unsaturated, etc.). The first step 934 of the reaction 903 is hydrolysis, in which trichloroalkylsilane 932 is combined with water molecules, causing the three chlorine groups from each trichloroalkylsilane molecule 932 to be replaced with three hydroxyl (—OH) side groups and three hydrochloric acid molecules per trichloroalkylsilane 932 to be released. The second step 936 of the reaction 903 is covalent bonding of a trichloroalkylsilane derivative 938 from step 934 with the substrate 930 and with one another. In step 936, dehydration of the trichloroalkylsilane derivative 938 allows for bonding of the trichloroalkylsilane derivative 938 with the substrate 930 via the oxygen groups of the trichloroalkylsilane derivative 938 to form a monolayer as shown. The trichloroalkylsilane derivatives 938 may also bond with one another via their oxygen groups. Although not shown, the (coated) substrate 930 may undergo a post-deposition cure following step 936 and may optionally undergo a second deposition step and a second cure (see FIG. 11A).

FIG. 12 depicts a chemical reaction 941 in which triethoxyalkylsilane 952 is deposited on the substrate 908 (see FIG. 11A). The R group of the triethoxyalkylsilane 952 may be any alkyl group as described herein (for example, the alkyl may be substituted or unsubstituted, linear or branched, saturated or unsaturated, etc.). The first step 954 of the reaction 941 is hydrolysis, in which triethoxyalkylsilane 952 is combined with water molecules, causing the three ethoxy groups from each triethoxyalkylsilane molecule 952 to be replaced with three hydroxyl (—OH) side groups and three ethanol molecules per triethoxyalkylsilane 952 to be released. The second step 956 of the reaction 941 is covalent bonding of a triethoxyalkylsilane derivative 958 from step 954 with the substrate 950 and with one another. In step 956, dehydration of the triethoxyalkylsilane derivative 958 allows for bonding of the triethoxyalkylsilane derivative 958 with the substrate 930 via the oxygen groups of the triethoxyalkylsilane derivative 958 to form a monolayer as shown. The triethoxyalkylsilane derivatives 958 may also bond with one another via their oxygen groups.

Although not shown, the (coated) substrate 950 may undergo a post-deposition cure following step 956 and may optionally undergo a second deposition step and a second cure (see FIG. 11A).

Deposition of a non-fluorinated organic coating material in accordance with the present disclosure produces a covalent bond with the underlying layer(s) and/or substrate, e.g., via the silane structure, with properties that are comparable to a PTFE coating and using conventional application processes. The non-fluorinated organic material is generally inert or exhibits very low reactivity to materials commonly encountered in a wet shaving environment, while also producing a coating that is highly durable and able to withstand repeated use in wet shaving conditions. As compared to PTFE, the non-fluorinated organic material allows a lower processing temperature, which helps to maintain the properties of the substrate, including strength and hardness. In addition, the non-fluorinated organic material, particularly silanes, may form a coating as a self-assembling monolayer that is uniform and does not require additional processing steps to thin the layer. The non-fluorinated organic coating materials described herein may be compatible with many different substrates, without causing corrosion, delamination, or negatively impacting a final tip shape.

Ideally, a coating or film comprising a non-fluorinated organic coating material in accordance with the present disclosure is conformal, relatively thin, and continuous and includes a high density of bond sites to the substrate surface and with adjacent molecules. The coating may be achieved over a properly designed blade edge profile and tip shape (e.g., over an asymmetric coating). With selection and pre-treatment of a proper substrate surface, along with one or more curing steps, these types of coatings may result in a razor blade that is highly durable and highly engaging, providing a good quality of cut and a low hair cutting force. In some examples, the coating may be a multilayer coating comprising a first uniform and well-bonded layer of a non-fluorinated organic material and a second layer of a non-fluorinated organic material that at least partially encapsulates the first layer. This multilayer coating may have significant advantages in both durability and hair cutting forces, although much thicker coatings and gel-like cross-linked polymers should be avoided.

Very sharp tip geometries, e.g., via a high aspect ratio coating, can also result in a significant reduction in cutting force but may also result in cutting of the skin. It has been demonstrated that a cutting edge with a slightly higher surface energy, e.g. from the non-fluorinated organic coating material, and a very sharp tip geometry may provide adequate or equivalent hair and skin engagement, as compared to a safer edge with a lower aspect ratio coating. Even with the slightly higher surface energy, the cutting edge in accordance with the present disclosure may have hair cutting forces that are still significantly reduced and may result in improved overall closeness of the shave.

FIG. 14 is a graph comparing cutting forces of razor blades, in accordance with the present disclosure, to an uncoated razor blade and a PTFE-coated razor blade. The Std. No Coating, Std. PTFE Coated, and Std. DMS Coated razor blades may be in accordance with the similarly named razor blades described with respect to FIGS. 13A and 13B. The HAR DMS Coated razor blades include a stainless steel razor blade with a high aspect ratio boron-based coating (e.g., an aspect ratio of about 2:1; see FIG. 3) and a DMS coating in accordance with the present disclosure (see FIG. 11A). It can be seen that the Std. DMS Coated razor blades exhibited a cutting force comparable to the Std. PTFE Coated blades. It can also be seen that the HAR DMS Coated razor blades exhibited significantly lower cutting forces than the Std. PTFE Coated razor blades.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method for making a razor blade, the razor blade comprising a first self-assembled monolayer (SAM) and a second SAM directly deposited on the first SAM, the method comprising:

forming a cutting edge on a substrate having an outer bonding surface;

depositing the first SAM comprising a non-fluorinated organic material on the outer bonding surface of the substrate, wherein the non-fluorinated organic material is an organosilane, wherein the organosilane is a mixture of compounds having the following general formula:

$$SiR_nX_m$$

in which R is an alkyl group; X is a leaving group selected from a chloride, an alkoxy, or a hydride; n=1-3; and m=1-3; n+m=4 and the alkyl group(s) R may be substituted or unsubstituted, linear or branched, saturated or unsaturated and identical alky groups or different alkyl groups; and depositing the second SAM comprising a non-fluorinated organic material directly on the first SAM.

2. The method of claim 1, further comprising curing the first SAM after depositing the first SAM on the outer bonding surface of the substrate.

3. The method of claim 2, wherein the curing is by at least one of UV curing or thermal curing.

4. The method of claim 3, wherein the curing is by UV curing with UV light having a wavelength of between 100 nm and 400 nm.

5. The method of claim 1, wherein, before the first SAM is deposited, treating the sharpened cutting edge with plasma further comprising gas mixture comprising a process gas and a carrier gas.

6. The method of claim 5, wherein the process gas is selected from the group consisting of: molecular oxygen, water, and alcohol; and the carrier gas comprises one or more gases selected from the group consisting of: nitrogen, argon, helium, neon, krypton, xenon, and radon.

7. The method of claim 1, wherein depositing the first SAM comprises one or more of: vapor deposition, dipping, flooding, spraying, or soaking.

8. The method of claim 1, wherein depositing the first SAM comprises vapor deposition.

9. The method of claim 1, wherein a temperature does not exceed 300° C. during the step of depositing the first SAM comprising a non-fluorinated organic material on the outer bonding surface of the substrate.

10. The method of claim 1, further comprising: forming the outer bonding surface by depositing at least one layer of material comprising one or more of: (i) diamond, amorphous diamond, or diamond-like-carbon (DLC); or (ii) chromium, platinum, boron, chromium diboride, titanium, titanium diboride, vanadium, aluminum, silicon, magnesium, manganese, iron, cobalt, nickel, copper, silver, zinc, tin, hafnium, tantalum, tungsten, zirconium, molybdenum, or niobium, and oxides, nitrides, and oxynitrides thereof on the substrate, wherein the at least one layer of material is disposed between the substrate and the first SAM.

11. The method of claim 1, further comprising: prior to depositing the first SAM, depositing at least one layer of material on the substrate comprising a non-fluorinated organic material on the outer bonding surface of the substrate.

12. A method for making a razor blade, the razor blade comprising a first SAM and a second SAM directly deposited on the first SAM, the method comprising:

forming an outer bonding surface on a sharpened cutting edge of a razor blade by depositing a first material on the sharpened cutting edge;

treating the outer bonding surface to form a treated outer bonding surface;

depositing the first SAM comprising a non-fluorinated organic material on top of the treated outer bonding surface; and curing the first SAM to form a cured first SAM, wherein the non-fluorinated organic material is an organosilane, wherein the organosilane is a mixture of compounds having the following general formula:

$$SiR_nX_m$$

in which R is an alkyl group; X is a leaving group selected from a chloride, an alkoxy, or a hydride; n=1-3; and m=1-3; n+m=4 and the alkyl group(s) R may be substituted or unsubstituted, linear or branched, saturated or unsaturated and identical alky groups or different alkyl groups; and depositing the second SAM comprising a non-fluorinated organic material directly on the cured first SAM followed by curing the second SAM.

13. The method of claim 12 wherein the curing of the first SAM comprises UV curing.

14. The method of claim 12 wherein the steps of forming the outer bonding surface, the treating the outer bonding surface, the depositing of the first SAM and the second SAM, and the curing of the first SAM and the second SAM are performed at a processing temperature that does not exceed 300° C.

15. The method of claim 12 wherein the steps of forming the outer bonding surface, the treating the outer bonding surface, the depositing of the first SAM and the second SAM, and the curing of the first SAM and the second SAM are performed at a processing temperature that does not exceed 200° C.

16. The method of claim 12 wherein curing the second SAM comprises UV curing.

17. The method of claim 12, wherein depositing the first SAM comprises one or more of: vapor deposition, dipping, flooding, spraying, or soaking.

* * * * *